United States Patent [19]

Eskra et al.

[11] Patent Number: 4,900,643
[45] Date of Patent: Feb. 13, 1990

[54] LEAD ACID BIPOLAR BATTERY PLATE AND METHOD OF MAKING THE SAME

[75] Inventors: Michael D. Eskra, Fredonia; William C. Delaney, Saukville; Gerald K. Bowen, Cedarburg, all of Wis.

[73] Assignee: Globe-Union Inc., Milwaukee, Wis.

[21] Appl. No.: 179,068

[22] Filed: Apr. 8, 1988

[51] Int. Cl.⁴ .............................................. H01M 4/74
[52] U.S. Cl. .................................... 429/241; 429/245; 429/210; 29/2
[58] Field of Search ................ 429/210, 241, 245; 29/2

[56] References Cited

U.S. PATENT DOCUMENTS

| | | | |
|---|---|---|---|
| 3,170,820 | 2/1965 | Drengler et al. | 429/210 X |
| 4,098,967 | 7/1978 | Biddick et al. | 429/210 |
| 4,237,205 | 12/1980 | Matter | 429/241 X |
| 4,275,130 | 6/1981 | Rippel et al. | 429/210 X |

Primary Examiner—Stephen J. Kalafut
Attorney, Agent, or Firm—Foley & Lardner

[57] ABSTRACT

A plate for a bipolar battery includes a planar substrate of plastic conductive material, with a mesh of metallic wire disposed therein, the surfaces of the wires exposed above the substrate surface. This divides the substrate surface into discrete areas.

19 Claims, 2 Drawing Sheets

LEAD ACID BIPOLAR BATTERY PLATE AND METHOD OF MAKING THE SAME

BACKGROUND OF THE INVENTION

This invention relates to a bipolar battery plate and more particularly relates to bipolar batteries of the lead acid type and a method of making the same.

The bipolar battery has shown increasing promise for use in applications where a high rate discharge performance is required such as in the starting, lighting and ignition (SLI applications) of automobiles. The traditional lead acid batteries generally employed suffer from the characteristic ohmic resistance provided by the electrode grid, grid lug, electrode current strap, and intercell connection. Large initial drops in voltage during high rate discharge are caused by the high current densities in such components. Additionally, the components increase the battery weight considerably, an unwanted feature today with the advent of light weight automobiles. Bipolar batteries, however, because of the elimination of the components above, offer considerable advantages and have often been considered as possible replacements for traditional monopolar batteries in SLI applications.

Generally, a bipolar battery is one that has plates with positive and negative active materials adhered to respective opposite sides of the plates. The function of the bipolar plate is to allow the current to pass from one electrode to another through a conductive substrate. This eliminates the need for grid lugs, current straps and intercell connections. The available cross-sectional area for conductivity is greatly increased. Additionally, the bipolar plates can be tightly stacked against each other with suitable electrolyte present, thus occupying less space.

Many variations of bipolar plates have been designed. Some such as U.S. Pat. No. 4,124,746 issued on Nov. 7, 1978 to Nordblom, et.al. involve the use of conductive metallic plates. U.S. Pat. No. 4,525,438 issued on July 25, 1985 to Pearson describes a bipolar battery in which metallic lead expanded into grids. Others exemplified by U.S. Pat. No. 4,098,967 issued on July 4, 1978 to Biddick, et.al. teach the use of conductive plastic substrates. Such designs, however, have not resulted in a entirely satisfactory bipolar plate. Metallic substrates, while highly conductive, are significantly heavier than plastic substrates and are much more prone to corrosive attack and ultimate intercell short circuits. Conductive plastic substrates have the advantage of weighing considerably less but have less conductivity. Additionally, extremely poor adhesion often results between the plastic substrate and active material. Metallic substrates have proven only moderately more successful in this regard.

SUMMARY OF THE INVENTION

The bipolar plate of the present invention significantly reduces many of the aforementioned problems by providing a folded metallic mesh which encloses the sides and top of a conductive plastic substrate and is partially embedded within the side surfaces thereof. The division of the large surface area of the substrate into smaller discrete areas and the increased total surface area offered by the combined mesh-substrate dramatically enhances the adhesion of the active material thereto. The continuous mesh going from one side of the plate to the other provides increased conductivity without sacrificing the reduced weight provided by the conductive substrate.

BRIEF DESCRIPTION OF THE DRAWINGS

A preferred exemplary embodiment of the present invention will hereinafter be described wherein like numerals denote like elements and.

DETAILED DESCRIPTION OF THE PREFERRED EMBODIMENT

Figure 1:
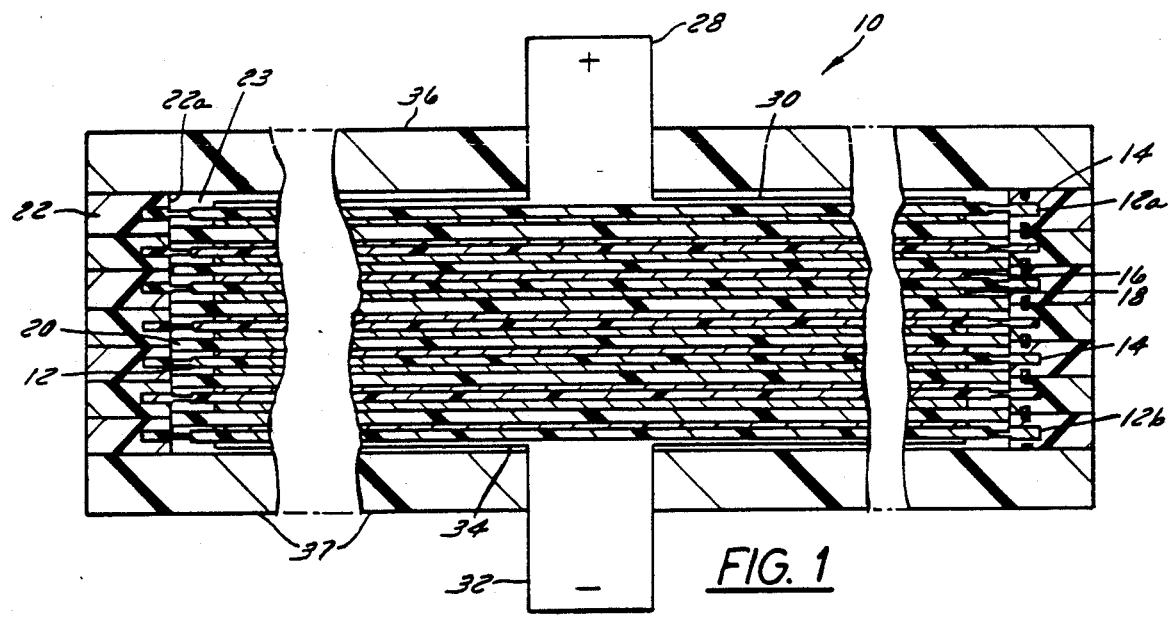
FIG. 1 is a top sectional view of the interior of a battery employing bipolar plates in accordance with the present invention.

The top sectional view of FIG. 1 depicts a battery 10 having a generally rectangular shape in section and comprising a plurality of stacked bipolar plates 12 sandwiched between two end blocks 36 and 37. Each plate 12, except for end plates 12a and 12b, have a substrate 14 with positive active material 18 and negative active material 16 adhered to the sides thereof. Each face of plate 12 abuts a separator 20 which serves to immobilize a liquid electrolyte that interacts electrochemically with the active materials 16 and 18 on the plate faces. To provide support for plates 12, the ends of substrate 14 are secured to a rectangularly-shaped frame 22 such that the entire plate 12 and frame 22 can be handled as a unit.

Figure 2:
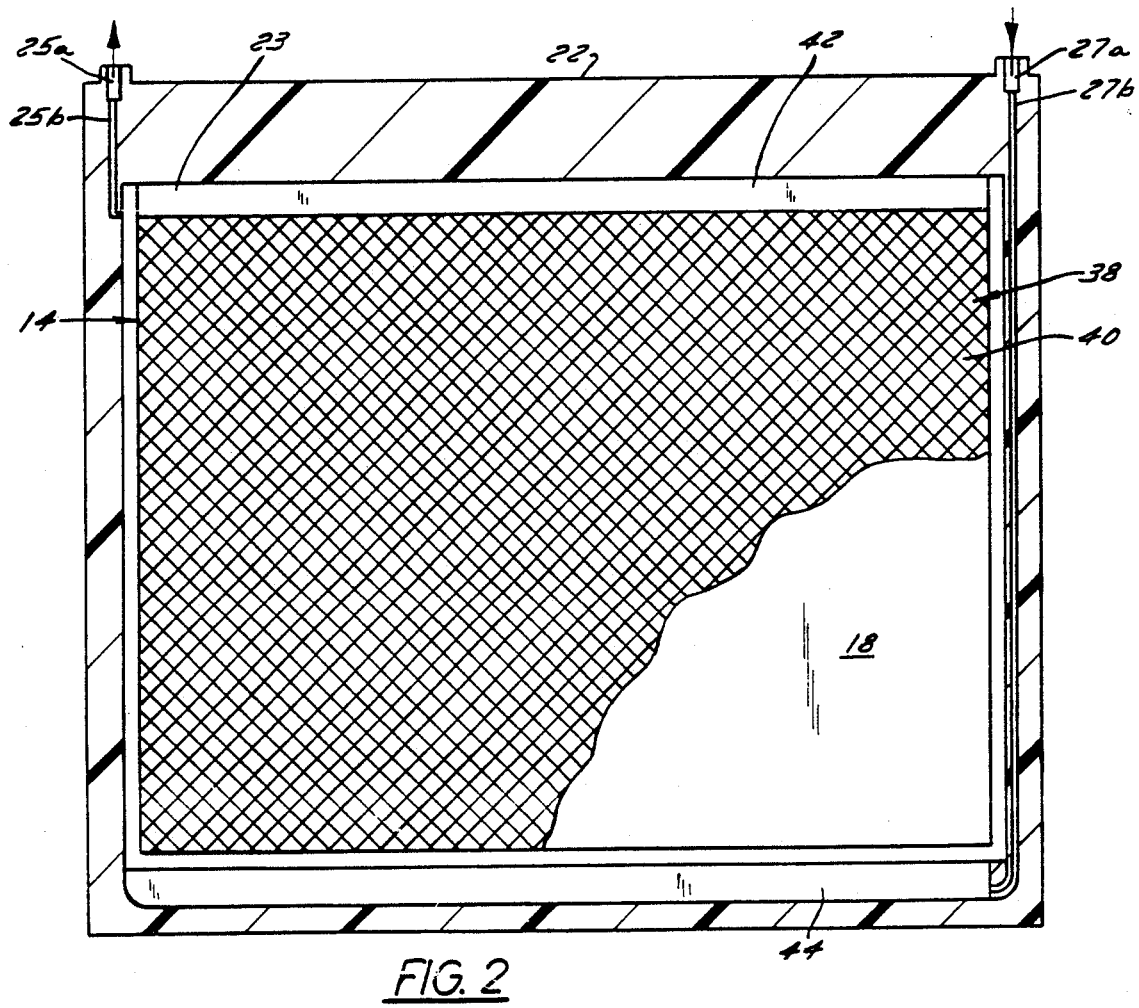
FIG. 2 is a side view of a single bipolar plate with the grid material exposed in accordance with the present invention.

Viewing the substrates 14 from the section, it can be seen that each end of substrates 14 have a greater width that the adjacent portion thereof and fits within a complimentary channels of the frame 22 located along the midpoint thereof. Additionally, the frame has a cross-sectional width greater than that of substrates 14, such that when the frames 22 and accompanying plates 12 are stacked and alternated with separators 20 slightly under pressure, each frame 22 is in a closely abutting relationship with an adjacent frame and encloses the plates 12 within. The grid and active material terminates short of each end of the substrate providing a space 23 defined by the interior wall 22a of frame 22, separator 20 and substrate 14. Each frame 22 may be formed with a pair of spaced surface grooves 25a, 27a in each major surface of frame 22 extending from the top of frame 22 terminating into channels 25b, 27b. Channel 27b as shown in FIG. 2 extends the entire length of frame 22. When frames 22 are stacked, the grooves and channels on the abutting frame surfaces mate to form internal passageways extending from the mouth thereof to space 23. As may be seen in FIG. 2, channel 25b communicates with space 23 near the top of frame 22 while channel 27b communicates with space 23 near the bottom thereof.

There are various ways to fit substrates 14 to frame 22. Frame 22 may be formed with a pair of slots along the two facing interior surfaces of the frame 22 from the top thereof. The substrates may then fit within the slots in a tongue and slot arrangement. Preferably, frame 22 being comprised of an inert non-conductive material may be injection molded about the sides of substrates 14. This technique immobilizes substrate 14 against movement within the slots. Once the various frames 22 and accompany plates 12 have been appropriately stacked, the frames may be locked together and sealed by thermal welding or other appropriate sealing processes.

After the proper seals within the battery 10 have been made, electrolyte may be added by forcing the electrolyte under pressure through groove 27b and applying a vacuum to groove 25a. A predetermined volume of electrolyte is then forced into space 23 and into the separator 20 partially filling the interstices therein. The opening to grooves 27a, 27b can be sealed off as desired, one alternative being the use of extensions from the battery casing top (not shown) which provides a fluid tight seal against extensions 25, 27.

The outward facing surfaces of terminal plate 12a which is at one end of battery 10 has no active material layer and includes a conductive plate 30 extending from positive terminal 28. Similarly, the outward facing surface of the terminal plate 12b has no active material and includes a conductive plate 34 extending from negative terminal 32. End blocks 36 and 37 enclose plates 30 and 34 and have openings permitting terminals 28 and 32 to extend through the openings which then may be sealed in any known manner.

Reference is now made to FIG. 2 where it may be seen that a portion of the active material has been eliminated in order to clearly portray a metallic sheet partially in the form of grid 38 on the surface of substrate 12. A grid 38 of metallic material is shown adhered to the surface of substrate 14, breaking the surface area of substrate 12 up into to discrete areas 40 having a diamond shape. Grid 38 terminates at, but is integral to, the metallic sheet forming fold 42 which is folded over the top of substrate 14. Although not shown in FIG. 2, a second grid 38 extends from fold 42 on the opposite side thereof and is adhered to the opposite surface of substrate 12, similarly dividing the surface into a discrete surface areas.

The material comprising the substrate 14 must necessarily be conductive and amenable to convenient fabrication and ultimate consolidation with the metallic grid. While various plastic materials impregnated with conductive filler are suitable, such as, for example, polyvinyledenefloride, tetrafloroethylene, polyethylene and polysulfone, it has been found that carbon-filled polypropylene provides the suitable characteristics needed. The percentage of carbon necessary for appropriate conductivity yet maintaining suitable substrate integrity and compatibility with the embedding of the mesh has been determined to be in the range of 12–25% by weight with 16–20% by weight being preferred.

The material forming the separator can be any of various fibrous or interconnected void volume materials having an affinity, i.e. high heat of wettability for the liquid electrolyte. One function of the separator in a closed battery, involving a starved electrolyte system such as the bipolar battery of this type, is to immobilize the electrolyte within the battery and to permit transfer therethrough of gas generated during charging from one electrode. Thus, to the opposite electrode it is desirable to utilize a material such as AGM or dexter glass mat which tends to permit movement of generated gas molecules along the glass fibers and through the interstices not occupied by electrolyte.

In any battery of the lead acid type, formation of materials known as battery mud occurs during operation and falls to the bottom of the battery. To facilitate collection of the battery mud, a shelf or mud collector 44 may be appropriately formed into frame 22 below the area to which grid 38 is secured. Additionally, the internal space defined by the abutment of adjacent collectors 44 may serve as a reservoir for any electrolyte not immobilized by the separators.

The metallic grid material employed can be any metallic material which has the characteristics necessary to form the desired functions such as, for example, compatibility with the substrate and proper electrochemical and conductive performance. Metallic materials such as lead, lead based alloys, and lead clad copper materials have all been found to perform satisfactorily. Other materials which may be used are titanium, tantalum, and zirconium.

An important aspect of bipolar battery conductive substrates is to ensure that substrate material not only serves as a conductor but provides a suitable base material for the proper adherence of the active materials. As discussed before, poor adherence of active materials to the underlying substrate may result in the break up of the active material caused by the changes in active material volume during battery operation. Large gas pockets can form behind the active material which pulls the active material away from the substrate reducing available conductivity paths. Large pieces may also fall off exposing the substrate to the corrosive effects of the electrolytes and undesirable gas generation. The use of a metallic grid, however, which is embedded in the substrate substantially reduces the bubbling or blistering of the active material since the available surface area of the substrate is broken into discrete areas. Additionally, adherence of the active material is promoted due to the uneven surface and better adhesion characteristics of the combined substrate and metallic grid surface.

Another unexpected advantage of the use of embedded metallic grids is the enhanced conductivity of the substrate itself. Apparently, substrates of conductive plastic, generally plastic composition having a percentage of conductive material, form a thin insulative layer at the surface thereof during manufacturing. By embedding a metallic grid into the surface of the substrate, the thin low conductive layer is broken up or bypassed as the embedded portion of the grid is contact with the more conductive, underlying regions of the substrate. In contrast, bipolar batteries using metallic foils adhered to a conductive substrates suffer not only from the infirmity of having to ensure that the adhesive itself is conductive but the presence of the less conductive layer lying adjacent the substrate surface.

Figure 3A:
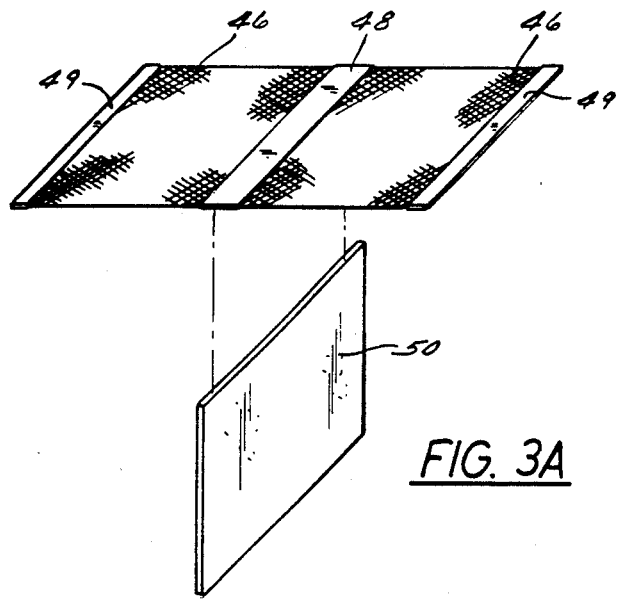
FIGS. 3A-3C represent a schematic view of a method of fabricating a bipolar plate in accordance with the present invention.
Figure 3B:
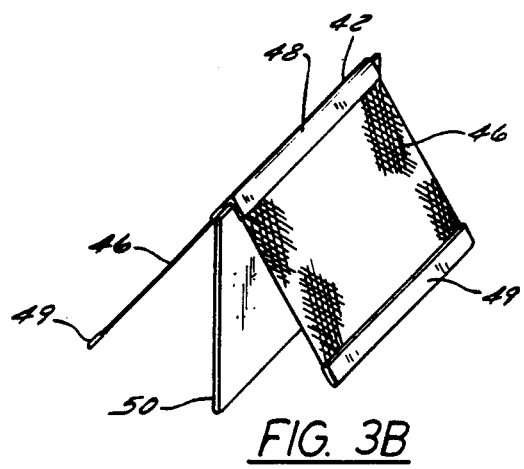
Figure 3C:
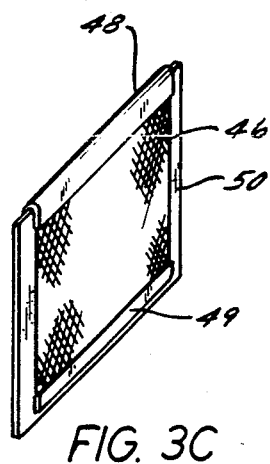

The fabrication of the bipolar plate in accordance with the present invention is best discussed by referring to FIGS. 3A–3B. The metallic grid which, by way of example, could be a lead based composition can be formed through any of several techniques, but a preferred way is through the use of rotary expander such as described in U.S. Pat. No. 4,291,443 issued on Sept. 29, 1981 to Cominco Ltd. of Vancouver, Canada which describes an apparatus forming metallic grids out of metal sheet. The grid is desireably formed in a continuous web having a grid portion of a predetermined width and length separated by a solid foil portion. The sheets can then be divided along the center line of every other foil portion to form a pair of grids 46 separated by a solid foil portion 48 in FIG. 3A and end portions 49. The connected pair of grids 46 are positioned adjacent a substrate 50 with the center line of foil 48 abutting the top edge thereof and thereafter folded over to place each grid 46 in contact with substrate 50. The width of grid 46 is slightly less than the width of substrate 50. Next, pressure is applied against both surfaces and grids 46 of the substrate and heated. The grid 46 is partially embedded into the substrate, then a plastic base frame is molded about the edges of the substrate and sealed thereto by thermal welding or other sealing techniques.

The appropriate pressure and heat to be applied is a function of the material composition of the conductive plastic substrate and metallic foil. However, it is necessary to ensure that the pressure and heat are sufficient to embed the metallic grid the desired distance within the substrate to provide sufficient operating integrity, i.e. no separation of the grid and underlying substrate during battery use, without weakening or destroying the substrate. To that extent, it has been found that heat can be employed which is sufficient to raise the temperature of the grid so as to cause melting of the substrate at the metallic grid substrate interface without causing the remainder of the substrate material to flow. The greater heat conductivity of the metallic grid is ideally suited for accomplishing this. For carbon filled polypropylene substrates having a thickness of 0.015–0.030 inches and a metallic grid of 0.015 inches wire having a diameter of 0.010–0.020 inches, it has been found that pressures from 25 psi to 100 psi, preferably 30 to 40 psi and wire temperatures of about 280°–340° F. provide proper embedment within the substrate.

Although the depth of embedment of the metallic grid required is again a function of the affinity between the materials comprising the substrate and metallic grid, it is preferred that the grid be embedded about one-half or more of the diameter of the individual metallic wires making up the grid. The mesh size of the grid and the diameter of the individual wires is dependent upon the appropriate balance between the desired weight of the plate and conductivity required among other variables. When using a carbon-filled polypropylene substrate of about 16% by weight carbon and a metallic grid of lead, it has been found advantageous to use a diamond shaped grid with a wire diameter of 0.015 inches. While the grid dimension itself is largely a matter of preference, it has been found desirable to use a long diagonal axis of about 0.27 inches and a short diagonal axis of about 0.19 inches. It should be clear, however, that other combinations of mesh sizes and wire diameters could be employed depending upon the application required and materials employed.

Because the metallic grid is actually folded over the top of the substrate, the adherence of the grid to the substrate is promoted since the substrate itself is supporting the metallic grid. Separation of the grid from the substrate is substantially minimized. Additionally, the continuous nature of the grid from one side to the other of the substrate supplies still another conductive path in addition to that provided by the substrate. This is particularly advantageous since the use of a conductive plastic instead of metallic plate sacrifices conductivity for a reduction in weight. The combined conductive plastic substrate and embedded folded metallic grid provides the needed light weight plate design without sacrificing conductivity.

It will be understood that the foregoing description is of a preferred exemplary embodiment of the present invention and that the invention is not limited to the specific forms shown. Modifications may be made in design and arrangement thereof within the scope of the present invention, as expressed in the appended claims.

We claim:

1. A plate for a bipolar battery comprising:
   (a) a planar substrate of plastic conductive material;
   (b) a mesh of metallic wire disposed within the surface of said substrate on both sides thereof so that a portion of the surfaces of said metallic wire is exposed above said substrate surface thereby dividing said substrate surface into discrete surface areas;
   (c) positive active material adhered to one of said sides of said substrate in contact with said discrete surface areas and said exposed surfaces of metallic wire; and
   (d) negative active material adhered to the other of said sides of said substrate in contact with said discrete surface areas and said exposed surfaces of said metallic wire.

2. The plate of claim 1 in which said mesh is continuous from said one side to said other side of the plate.

3. The plate of claim 1 in which said mesh is embedded within said substrate a depth not less than one-half of the diameter of said wire.

4. The plate of claim 1 in which said substrate is comprised of material selected from a group consisting of polyvinyledenefloride, tetrafloroethylene, polyethylene, polysulfone, and polypropylene impregnated with a conductive material.

5. The plate of claim 4 in which said substrate is comprised of carbon filled polypropylene.

6. The plate of claim 5 which said polypropylene is impregnated with carbon in the percentage of 12% to 25% by weight of carbon.

7. The plate of claim 1 in which said wire has a diameter of about 0.015 to 0.030 inches.

8. A bipolar battery comprising:
   (a) a plurality of non-conductive frames stacked in an abutting and seal tight relationship;
   (b) an end block at each end of the stacked frames and together with said frames defining an enclosed space therein;
   (c) a plurality of planar members having major surfaces secured around the circumference thereof to said frames and partitioning the defined space into a plurality of smaller spaces lying between said adjacent planar members, each of said planar members comprising a conductive plastic substrate, a metallic grid partially embedded in each major surface of said planar members, positive acting material lying over said metallic grid and adhered to one of said major surfaces of said members and negative active material lying over said metallic grid and adhered to the other of said major surfaces; and
   (d) separator means for immobilizing electrolyte positioned within said smaller spaces and in an abutting relationship with said active material.

9. The bipolar battery of claim 8 in which said frames define first and second electrolyte tunnels each communicating with an opening in said frame and with said smaller spaces.

10. The bipolar battery of claim 8 in which said metallic grids on opposite major surfaces of each substrate are integrally connected.

11. The bipolar battery of claim 10 in which said metallic grids on opposite major surfaces of each substrate are connected to metallic foil folded over the top of said substrate.

12. A method of fabricating bipolar plates comprising the steps of:

(a) forming a planar member of conductive plastic material of selected length and width;

(b) placing a grid of metallic wire in contact with each of the major surfaces of said planar member;

(c) applying pressure and heat sufficient to cause a melting of the planar member to cause a melting of the planar member at the interface with said metallic grid such that the metallic grid becomes embedded a predetermined depth of the diameter of said wire in said planar member; and (d) adhering positive active material to one of said major surfaces over said metallic grid embedded therein and negative active material to the other of said major surfaces over said metallic grid embedded therein.

13. The method of claim 12 including the step of folding a grid of metallic wire around one end of said substrate and into contact with each of said major surfaces.

14. The method of claim 12 including the forming of a frame with spaced-apart sides circumferentially around the ends of said planar member.

15. The method of claim 14 in which said frame is formed around said planar member with a spaced pair of grooves extending from the top of said frame along two of the spaced-apart sides to an interior space between said spaced apart sides.

16. The method of claim 12 in which said conductive plastic material is selected from a group consisting of polyvinyledenefloride, tetrafluoroethylene, polyethylene, polypropylene or polysulfone impregnated with a conductive filler.

17. The method of claim 16 in which said conductive plastic material is polypropylene filled with 12 to 25 by weight percent of carbon.

18. The method of claim 17 in which said metallic grid is comprise lead wire and the pressure applied is 25 psi to 100 psi at a temperature of 280° F. to 340° F. for a time period of about 1 to 1.5 minutes.

19. The method of claims 18 in which said conductive plastic material has a thickness of about 0.015 to 0.030 inches.

* * * * *